United States Patent
Cheng et al.

(10) Patent No.: US 10,044,531 B2
(45) Date of Patent: Aug. 7, 2018

(54) METHOD FOR ESTIMATING RESPONSE OF BASEBAND SELF-INTERFERENCE CHANNEL AND APPARATUS

(71) Applicant: HUAWEI TECHNOLOGIES CO., LTD., Shenzhen (CN)

(72) Inventors: Hong Cheng, Shenzhen (CN); Teyan Chen, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 15/332,483

(22) Filed: Oct. 24, 2016

(65) Prior Publication Data
US 2017/0041165 A1 Feb. 9, 2017

Related U.S. Application Data

(63) Continuation of application No. PCT/CN2014/076232, filed on Apr. 25, 2014.

(51) Int. Cl.
*H04L 25/03* (2006.01)
*H04L 1/00* (2006.01)
(Continued)

(52) U.S. Cl.
CPC ......... *H04L 25/03159* (2013.01); *H04L 1/00* (2013.01); *H04L 5/14* (2013.01);
(Continued)

(58) Field of Classification Search
None
See application file for complete search history.

(56) References Cited

U.S. PATENT DOCUMENTS

| | | | | |
|---|---|---|---|---|
| 9,713,010 B2 * | 7/2017 | Khandani | ............. | H04W 16/14 |
| 2010/0118922 A1 * | 5/2010 | Ahn | .................... | H04B 7/15585 |
| | | | | 375/214 |
| 2012/0201153 A1 * | 8/2012 | Bharadia | ................ | H04B 1/525 |
| | | | | 370/252 |

FOREIGN PATENT DOCUMENTS

| | | |
|---|---|---|
| CN | 102412931 A | 4/2012 |
| CN | 103595520 A | 2/2014 |
| WO | WO2012102665 A1 | 8/2012 |

OTHER PUBLICATIONS

International Search Report dated Jan. 26, 2015 in WIPO Application No. PCT/CN2014/076232.
(Continued)

*Primary Examiner* — Hong Cho
(74) *Attorney, Agent, or Firm* — Oblon, McClelland, Maier & Neustadt, L.L.P.

(57) ABSTRACT

The embodiments of present disclosure provide a method for estimating a response of a baseband self-interference channel and an apparatus, where the method includes: estimating a response of a baseband self-interference channel to obtain a first estimation response of the baseband self-interference channel; starting to perform first full duplex communication; canceling baseband self-interference in a first baseband received signal according to the first estimation response, where the first baseband received signal is a baseband signal received during the first full duplex communication; determining a first parameter of the baseband self-interference channel; determining an estimation policy of the baseband self-interference channel according to the first parameter; and estimating the response of the baseband self-interference channel according to the estimation policy.

20 Claims, 4 Drawing Sheets

(51) Int. Cl.
*H04L 5/14* (2006.01)
*H04L 12/801* (2013.01)
*H04L 27/26* (2006.01)
*H04L 5/00* (2006.01)

(52) U.S. Cl.
CPC ............ *H04L 47/29* (2013.01); *H04L 5/0007* (2013.01); *H04L 5/0048* (2013.01); *H04L 5/1461* (2013.01); *H04L 27/2601* (2013.01)

(56) References Cited

OTHER PUBLICATIONS

International Search Report and Written Opinion dated Jan. 26, 2015 in PCT/CN2014/076232 (with English translation of Category of Cited Documents).

\* cited by examiner

METHOD FOR ESTIMATING RESPONSE OF BASEBAND SELF-INTERFERENCE CHANNEL AND APPARATUS

CROSS-REFERENCE TO RELATED APPLICATIONS

This application is a continuation of International Application No. PCT/CN2014/076232, filed on Apr. 25, 2014, the disclosure of which is hereby incorporated by reference in its entirety.

TECHNICAL FIELD

Embodiments of the present disclosure relate to the field of communications technologies, and more specifically, to a method for estimating a response of a baseband self-interference channel and an apparatus.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless full duplex technology implements that two communications nodes perform bidirectional signal transmission on a same time frequency resource. That is, a communications node that supports wireless full duplex can perform uplink/downlink transmission by using a same time frequency resource. However, when communication is performed by using the wireless full duplex technology, a transmit signal of the communications node interferes with a received signal of the communications node. Such interference is referred to as self-interference. A channel between a baseband transmission module and a baseband receiving module that are of the communications node is referred to as a baseband self-interference channel. Specifically, the baseband self-interference channel may include a cascade of the following: a transmit radio frequency channel response, a spatial channel, a leaked channel response of echo reflection of a radio frequency circuit, analog interference cancellation, and a channel response of a receive radio frequency channel. Further, if the communications node uses a circulator, the baseband self-interference channel may further include a channel response of the circulator.

To reduce impact caused by the self-interference on correct receiving of a desired signal, the communications node that supports the wireless full duplex needs to cancel the self-interference. A self-interference cancellation method includes one or more of the following: antenna isolation, analog interference cancellation, and digital interference cancellation.

A digital interference cancellation process includes: A communications node that supports wireless full duplex may estimate a response of a baseband self-interference channel of the communications node, and the communications node reconstructs baseband self-interference by using the estimated response of the baseband self-interference channel, and then subtracts the reconstructed baseband self-interference from actual baseband self-interference. A subtraction result is referred to as residual interference of the baseband self-interference channel, residual interference for short. Specifically, a subtraction result may be shown in formula 1.1:

$$r = x_{rx} - x'_{rx} \qquad \text{Formula 1.1}$$

where r indicates the residual interference, $x_{rx}$ indicates the actual baseband self-interference, and $x'_{rx}$ indicates the reconstructed baseband self-interference. Further, $x_{rx} = hx$, where h indicates a response of the baseband self-interference channel, and x indicates a baseband transmit signal. $x'_{rx} = h'x$, where h' indicates the estimated response of the baseband self-interference channel.

SUMMARY

A signal that is used to estimate the response of the baseband self-interference channel is referred to as a baseband estimation signal. The baseband estimation signal may be a baseband signal of the communications node. A time domain resource and a frequency domain resource that are used to send the baseband estimation signal affect precision of the estimated response of the baseband self-interference channel. Therefore, the precision of the estimated response of the baseband self-interference channel can be increased by selecting a proper time domain resource or frequency domain resource for sending the baseband estimation signal.

Embodiments of the present disclosure provide a method for estimating a response of a baseband self-interference channel and an apparatus, which can effectively increase precision of an estimated response of a baseband self-interference channel.

According to a first aspect, an embodiment of the present disclosure provides a method for estimating a response of a baseband self-interference channel, where the method includes: estimating a response of a baseband self-interference channel to obtain a first estimation response of the baseband self-interference channel; starting to perform first full duplex communication; canceling baseband self-interference in a first baseband received signal according to the first estimation response, where the first baseband received signal is a baseband signal received during the first full duplex communication; determining a first parameter of the baseband self-interference channel, where the first parameter is related to residual interference of the baseband self-interference channel; determining an estimation policy of the baseband self-interference channel according to the first parameter; and estimating the response of the baseband self-interference channel according to the estimation policy.

With reference to the first aspect, in a first possible implementation manner, the first baseband received signal includes a first baseband received signal at a first time and a first baseband received signal at a second time; and the determining a first parameter of the baseband self-interference channel includes: determining a baseband signal transmitted at the first time and a processed signal at the first time, where the processed signal at the first time is the first baseband received signal, at the first time, in which the baseband self-interference is canceled; determining a baseband signal transmitted at the second time and a processed signal at the second time, where the processed signal at the second time is the first baseband received signal, at the second time, in which the baseband self-interference is canceled; and determining the first parameter according to the baseband signal transmitted at the first time, the processed signal at the first time, the baseband signal transmitted at the second time, and the processed signal at the second time, where the first parameter is in direct proportion to power of the residual interference of the baseband self-interference channel.

With reference to the first possible implementation manner, in a second possible implementation manner, the determining the first parameter according to the baseband signal transmitted at the first time, the processed signal at the first time, the baseband signal transmitted at the second time, and the processed signal at the second time includes: determining the first parameter according to the following formula:

$$R_1 = \sum_{n=1}^{N} x_2(n) y'_2(n) - \sum_{n=1}^{N} x_1(n) y'_1(n),$$

where $R_1$ is the first parameter, $x_1(n)$ is the baseband signal transmitted at the first time, $y'_1(n)$ is the baseband received signal at the first time, $x_2(n)$ is the baseband signal transmitted at the second time, and $y'_2(n)$ is the baseband received signal at the second time.

With reference to the first possible implementation manner or the second possible implementation manner, in a third possible implementation manner, the determining an estimation policy of the baseband self-interference channel according to the first parameter includes: if the first parameter is greater than a first preset threshold, determining to stop performing the first full duplex communication and re-start to estimate the response of the baseband self-interference channel.

With reference to any possible implementation manner of the first possible implementation manner to the third possible implementation manner, in a fourth possible implementation manner, the first time is a time for starting to perform the first full duplex communication, and the second time is a time at which a decreased value of channel quality of the first full duplex communication is less than a second preset threshold.

With reference to the first aspect, in a fifth possible implementation manner, the estimating a response of a baseband self-interference channel to obtain a first estimation response of the baseband self-interference channel includes: estimating the response of the baseband self-interference channel by using a baseband estimation signal with a first frequency domain density; and the determining an estimation policy of the baseband self-interference channel according to the first parameter includes: if the first parameter is greater than a third preset threshold, determining that the estimation policy of the baseband self-interference channel is estimating the response of the baseband self-interference channel by using a baseband estimation signal with a second frequency domain density, where the second frequency domain density is greater than the first frequency domain density; or if the first parameter is less than the third preset threshold, determining that the estimation policy of the baseband self-interference channel is estimating the response of the baseband self-interference channel by using the baseband estimation signal with the first frequency domain density.

With reference to the fifth possible implementation manner, in a sixth possible implementation manner, the determining a first parameter of the baseband self-interference channel includes: determining power of first residual interference; and determining the power of the first residual interference as the first parameter.

With reference to the fifth possible implementation manner or the sixth possible implementation manner, in a seventh possible implementation manner, in a case of the determining that the estimation policy of the baseband self-interference channel is estimating the response of the baseband self-interference channel by using a baseband estimation signal with a second frequency domain density, the estimating the response of the baseband self-interference channel according to the estimation policy includes: estimating, by using the baseband estimation signal with the second frequency domain density, the response of the baseband self-interference channel to obtain a second estimation response; starting to perform second full duplex communication; canceling baseband self-interference in a second baseband received signal according to the second estimation response, where the second baseband received signal is a baseband signal received during the second full duplex communication; determining power of second residual interference; and if the power of the second residual interference is less than the third preset threshold, determining to keep the frequency domain density of the baseband estimation signal unchanged; or if the power of the second residual interference is greater than the third preset threshold, determining a second parameter according to the power of the second residual interference and the power of the first residual interference, and determining, according to the second parameter, whether to increase the frequency domain density of the baseband estimation signal.

With reference to the seventh possible implementation manner, in an eighth possible implementation manner, the determining a second parameter according to the power of the second residual interference and the power of the first residual interference includes: determining the second self-interference channel parameter by using the following formula: $R_2=P_1-P_2$, where $R_2$ is the second parameter, $P_1$ is the power of the first residual interference, and $P_2$ is the power of the second residual interference.

With reference to the eighth possible implementation manner, in a ninth possible implementation manner, the determining, according to the second parameter, whether to increase the frequency domain density of the baseband estimation signal includes: if the second parameter is greater than a fourth preset threshold, determining to increase the frequency domain density of the baseband estimation signal; or if the second parameter is less than the fourth preset threshold, determining to keep the frequency domain density of the baseband estimation signal unchanged.

According to a second aspect, an embodiment of the present disclosure provides an apparatus, where the apparatus includes: a control unit, configured to estimate a response of a baseband self-interference channel to obtain a first estimation response of the baseband self-interference channel, and a communications unit, configured to perform first full duplex communication, where the control unit is further configured to cancel baseband self-interference in a first baseband received signal according to the first estimation response, where the first baseband received signal is a baseband signal received by the communications unit during the first full duplex communication; the control unit is further configured to determine a first parameter of the baseband self-interference channel, where the first parameter is related to power of residual interference of the baseband self-interference channel; the control unit is further configured to determine an estimation policy of the baseband self-interference channel according to the first parameter; and the control unit is further configured to estimate the response of the baseband self-interference channel according to the estimation policy.

With reference to the second aspect, in a first possible implementation manner, the control unit is specifically configured to: determine a baseband signal transmitted at a first time and a processed signal at the first time, where the processed signal at the first time is a first baseband received signal, at the first time, in which the baseband self-interference is canceled; determine a baseband signal transmitted at a second time and a processed signal at the second time, where the processed signal at the second time is a first baseband received signal, at the second time, in which the baseband self-interference is canceled; and determine the first parameter according to the baseband signal transmitted at the first time, the processed signal at the first time, the baseband signal transmitted at the second time, and the processed signal at the second time, where the first parameter is in direct proportion to the power of the residual interference of the baseband self-interference channel.

With reference to the first possible implementation manner, in a second possible implementation manner, the control unit is specifically configured to determine the first parameter according to the following formula:

$$R_1 = \sum_{n=1}^{N} x_2(n)y'_2(n) - \sum_{n=1}^{N} x_1(n)y'_1(n),$$

where $R_1$ is the first parameter, $x_1(n)$ is the baseband signal transmitted at the first time, $y'_1(n)$ is the baseband received signal at the first time, $x_2(n)$ is the baseband signal transmitted at the second time, and $y'_2(n)$ is the baseband received signal at the second time.

With reference to the first possible implementation manner or the second possible implementation manner, in a third possible implementation manner, the control unit is specifically configured to: if the first parameter is greater than a first preset threshold, determine to stop performing the first full duplex communication and re-start to estimate the response of the baseband self-interference channel.

With reference to the second aspect, in a fourth possible implementation manner, the control unit is specifically configured to estimate the response of the baseband self-interference channel by using a baseband estimation signal with a first frequency domain density; and the control unit is specifically configured to: if the first parameter is greater than a third preset threshold, determine that the estimation policy of the baseband self-interference channel is estimating the response of the baseband self-interference channel by using a baseband estimation signal with a second frequency domain density, where the second frequency domain density is greater than the first frequency domain density; or if the first parameter is less than the third preset threshold, determine that the estimation policy of the baseband self-interference channel is estimating the response of the baseband self-interference channel by using the baseband estimation signal with the first frequency domain density.

With reference to the fourth possible implementation manner, in a fifth possible implementation manner, the control unit is specifically configured to: determine power of first residual interference, and determine the power of the first residual interference as the first parameter.

With reference to the fourth possible implementation manner or the fifth possible implementation manner, in a sixth possible implementation manner, the control unit is further configured to estimate, by using the baseband estimation signal with the second frequency domain density, the response of the baseband self-interference channel to obtain a second estimation response; the communications unit is further configured to start second full duplex communication; the control unit is further configured to cancel baseband self-interference in a second baseband received signal according to the second estimation response, where the second baseband received signal is a baseband signal received during the second full duplex communication; the control unit is further configured to determine power of second residual interference; and the control unit is further configured to: if the power of the second residual interference is less than the third preset threshold, determine to keep the frequency domain density of the baseband estimation signal unchanged; or the control unit is further configured to: if the power of the second residual interference is greater than the third preset threshold, determine a second parameter according to the power of the second residual interference and the power of the first residual interference, and determine, according to the second parameter, whether to increase the frequency domain density of the baseband estimation signal.

With reference to the sixth possible implementation manner, in a seventh possible implementation manner, the control unit is specifically configured to determine the second parameter by using the following formula: $R_2=P_1-P_2$, where $R_2$ is the second parameter, $P_1$ is the power of the first residual interference, and $P_2$ is the power of the second residual interference.

With reference to the seventh possible implementation manner, in an eighth possible implementation manner, the control unit is specifically configured to: if the second parameter is greater than a fourth preset threshold, determine to increase the frequency domain density of the baseband estimation signal; or if the second parameter is less than the fourth preset threshold, determine to estimate the response of the baseband self-interference channel by using the baseband estimation signal with the first frequency domain density.

With reference to any one of the second aspect or the foregoing possible implementation manners, in a ninth possible implementation manner, the apparatus is applied to a terminal or a network node, the terminal includes a mobile terminal and a fixed terminal, and the network node includes a base station and an access point.

In the foregoing technical solutions, a communications node can determine a corresponding estimation policy of a baseband self-interference channel according to a first parameter of the baseband self-interference channel, and estimate a response of the baseband self-interference channel according to the determined estimation policy of the baseband self-interference channel. In this way, the communications node can effectively increase precision of the estimated response of the baseband self-interference channel.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the embodiments of present disclosure.

It should be understood that the technical solutions in the embodiments of the present disclosure may be applied to various full duplex communications systems. All communications nodes mentioned in the embodiments of the present disclosure support a wireless full duplex system. The communications node mentioned in the embodiments of the present disclosure may be user equipment, or may be a network node such as a base station or an access point (AP). The user equipment (UE) may communicate with one or more core networks by using a radio access network (RAN). The user equipment may be a fixed terminal or may be a mobile terminal, such as a mobile phone (or referred to as a "cellular" phone) and a computer with a mobile terminal. For example, the user equipment may be a portable, pocket-sized, handheld, computer built-in, or vehicle-mounted mobile apparatus.

Figure 1:
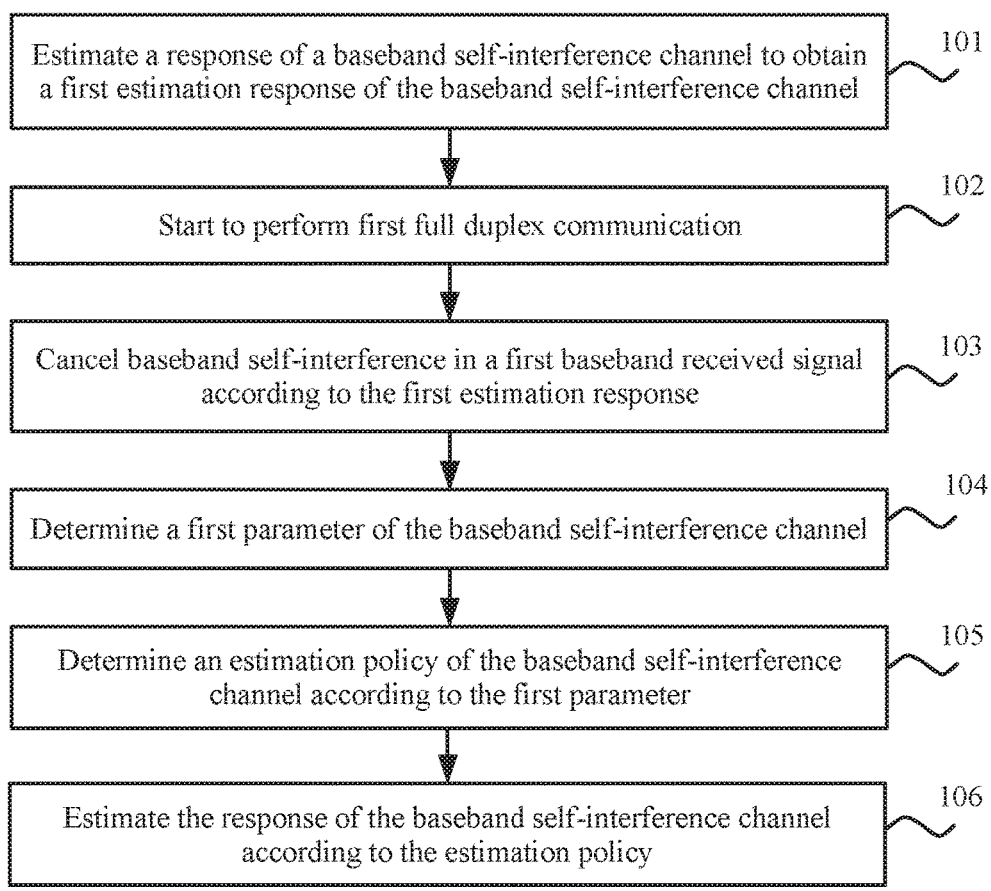
FIG. 1 is a schematic flowchart of a method for estimating a response of a baseband self-interference channel according to an embodiment of the present disclosure.

FIG. 1 is a schematic flowchart of a method for estimating a response of a baseband self-interference channel according to an embodiment of the present disclosure.

101. Estimate a response of a baseband self-interference channel to obtain a first estimation response of the baseband self-interference channel.

102. Start to perform first full duplex communication.

103. Cancel baseband self-interference in a first baseband received signal according to the first estimation response, where the first baseband received signal is a baseband signal received during the first full duplex communication.

104. Determine a first parameter of the baseband self-interference channel, where the first parameter is related to residual interference of the baseband self-interference channel.

105. Determine an estimation policy of the baseband self-interference channel according to the first parameter.

106. Estimate the response of the baseband self-interference channel according to the estimation policy.

According to the method shown in FIG. 1, a communications node can determine a corresponding estimation policy of a baseband self-interference channel according to a first parameter of the baseband self-interference channel, and estimate a response of the baseband self-interference channel according to the determined estimation policy of the baseband self-interference channel. In this way, the communications node can effectively increase precision of the estimated response of the baseband self-interference channel.

Optionally, in an embodiment, the estimating a response of a baseband self-interference channel to obtain a first estimation response of the baseband self-interference channel includes: estimating, by using a baseband estimation signal, the response of the baseband self-interference channel to obtain the first estimation response. The first baseband received signal may include a baseband received signal at a first time and a baseband received signal at a second time. The first baseband received signal at the first time refers to a baseband signal received at the first time of the first full duplex communication. The first baseband received signal at the second time refers to a baseband signal received at the second time of the first full duplex communication. The determining a first parameter of the baseband self-interference channel includes: determining a baseband signal transmitted at the first time and a processed signal at the first time, where the processed signal at the first time is the first baseband received signal, at the first time, in which the baseband self-interference is canceled; determining a baseband signal transmitted at the second time and a processed signal at the second time, where the processed signal at the second time is the first baseband received signal, at the second time, in which the baseband self-interference is canceled; and determining the first parameter according to the baseband signal transmitted at the first time, the processed signal at the first time, the baseband signal transmitted at the second time, and the processed signal at the second time, where the first parameter of the baseband self-interference channel is in direct proportion to power of the residual interference of baseband self-interference cancellation.

Specifically, the first parameter may be determined according to the following formula:

$$R_1 = \sum_{n=1}^{N} x_2(n) y'_2(n) - \sum_{n=1}^{N} x_1(n) y'_1(n) \qquad \text{Formula 1.2}$$

where $R_1$ is the first parameter, $x_1(n)$ is the baseband signal transmitted at the first time, $y'_1(n)$ is the processed signal at the first time, $x_2(n)$ is the baseband signal transmitted at the second time, and $y'_2(n)$ is the processed signal at the second time.

$$\sum_{n=1}^{N} x_2(n) y'_2(n)$$

indicates a correlation coefficient of the second time, and $$\sum_{n=1}^{N} x_1(n) y'_1(n)$$

indicates a correlation coefficient of the first time. The correlation coefficient of the first time and the correlation coefficient of the second time are in direct proportion to the power of the residual interference of the baseband self-interference channel.

The determining an estimation policy of the baseband self-interference channel according to the first parameter includes: if the first parameter is greater than a first preset threshold, determining that the estimation policy of the baseband self-interference channel is stopping performing the first full duplex communication and re-starting to estimate the response of the baseband self-interference channel. In this case, the estimating the response of the baseband self-interference channel according to the estimation policy includes: stopping performing the first full duplex communication and re-starting to estimate the response of the baseband self-interference channel. Optionally, the first time may be a time for starting to perform the first full duplex communication, and the second time may be a time at which a decreased value of channel quality of the first full duplex communication is less than a second preset threshold, where the channel quality may include any one or more of the following: a signal to interference plus noise ratio (SINR), a channel quality indication (CQI), or the like.

Optionally, in another embodiment, the estimating a response of a baseband self-interference channel to obtain a first estimation response of the baseband self-interference channel includes: estimating, by using a baseband estimation signal with a first frequency domain density, the response of the baseband self-interference channel to obtain the first estimation response of the baseband self-interference channel. Power of first residual interference is power of the residual interference of the baseband self-interference channel in the first full duplex communication. The power of the first residual interference may be obtained by means of measurement. The determining an estimation policy of the baseband self-interference channel according to the first parameter includes: if the first parameter is greater than a third preset threshold, determining that the estimation policy of the baseband self-interference channel is estimating the response of the self-interference channel by using a baseband estimation signal with a second frequency domain density, where the second frequency domain density is greater than the first frequency domain density; or if the first parameter is less than the third preset threshold, determining that the estimation policy of the baseband self-interference channel is estimating the response of the self-interference channel by using the baseband estimation signal with the first frequency domain density. In other words, if the first parameter is less than the third preset threshold, the estimation policy of the self-interference channel remains unchanged.

Further, the determining a first parameter of the baseband self-interference channel includes: determining power of first residual interference; and determining the power of the first residual interference as the first parameter.

Further, in a case of determining to estimate the response of the baseband self-interference channel by using the baseband estimation signal with the second frequency domain density, the estimating the response of the baseband self-interference channel according to the estimation policy includes: estimating, by using the baseband estimation signal with the second frequency domain density, the response of the baseband self-interference channel to obtain a second estimation response; starting to perform second full duplex communication; canceling baseband self-interference in a second baseband received signal according to the second estimation response, where the second baseband received signal is a baseband signal received during the second full duplex communication; determining power of second residual interference; and determining, according to the power of the second residual interference, whether to increase the frequency domain density of the baseband estimation signal. Specifically, if the power of the second residual interference is less than the third preset threshold, it is determined to keep the frequency domain density of the baseband estimation signal unchanged; or if the power of the second residual interference is greater than the third preset threshold, a second parameter is determined according to the power of the second residual interference and the power of the first residual interference. The power of the second residual interference is power of residual interference of the baseband self-interference channel in the second full duplex communication. The power of the second residual interference may be obtained by means of measurement.

Optionally, in an embodiment, the second parameter may be determined by using the following formula:

$$R_2 = P_1 - P_2 \quad \text{Formula 1.3}$$

where $R_2$ is the second parameter, $P_1$ is the power of the first residual interference, and $P_2$ is the power of the second residual interference. The determining, according to the second parameter, whether to increase the frequency domain density of the baseband estimation signal includes: if the second parameter is greater than a fourth preset threshold, determining to increase the frequency domain density of the baseband estimation signal; or if the second parameter is less than the fourth preset threshold, determining to estimate the response of the baseband self-interference channel by using the baseband estimation signal with the first frequency domain density.

Figure 2:
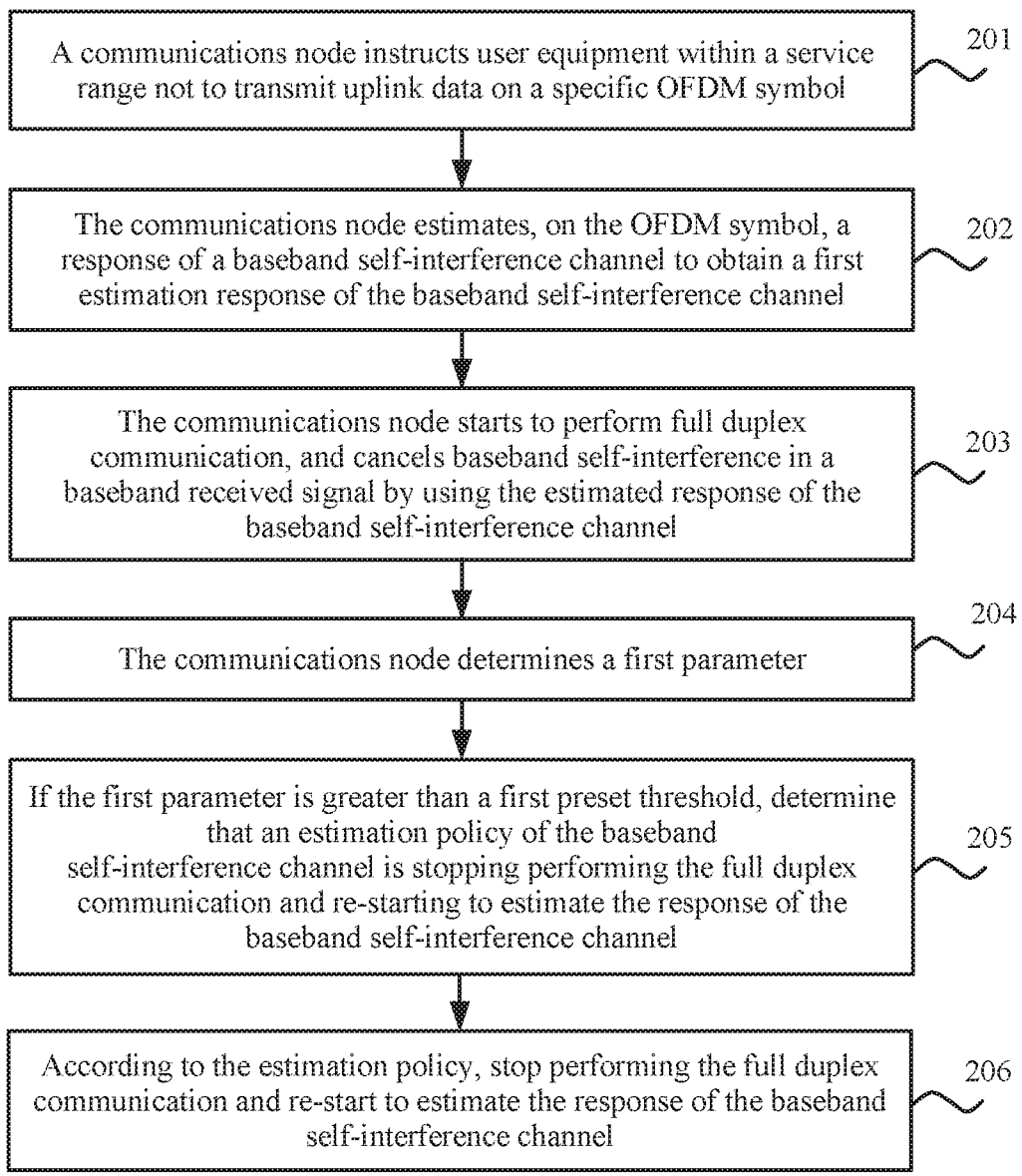
FIG. 2 is a schematic flowchart of a method for estimating a response of a baseband self-interference channel according to an embodiment of the present disclosure.

FIG. 2 is a schematic flowchart of a method for estimating a response of a baseband self-interference channel according to an embodiment of the present disclosure. The embodiment shown in FIG. 2 is a specific embodiment of the embodiment shown in FIG. 1. In the embodiment shown in FIG. 2, a long-term evolution (LTE) system is used as an example. A person skilled in the art may understand that the method provided by the embodiments of present disclosure may be further applied to another full duplex communications system.

201. A communications node instructs user equipment within a service range not to transmit uplink data on a specific orthogonal frequency division multiplexing (OFDM) symbol. The communications node may be a home eNodeB (Femto Base Station).

202. The communications node estimates, on the OFDM symbol, a response of a baseband self-interference channel to obtain a first estimation response of the baseband self-interference channel.

Specifically, the communications node transmits a baseband estimation signal x on one resource block on the OFDM symbol. After the baseband estimation signal x passes through a transmit radio frequency channel, a transceiver spatial channel, and a receive radio frequency channel, and is processed by means of analog interference cancellation, the communications node may receive a baseband signal y corresponding to the baseband estimation signal x. Without considering nonlinearity of an aggregate channel between a receiving module and a sending module that are of a baseband of the communications node, a frequency domain of the baseband signal y received by the communications node is indicated as y=hx+n, where h is a to-be-estimated response of the baseband self-interference channel, and n is a noise. The response of the baseband self-interference channel may be estimated by using a method such as a minimum mean square error (MMSE), or least square (LS). A specific process of estimating the response of the baseband self-interference channel is common content of a person skilled in the art, and it is unnecessary to describe details herein.

203. The communications node starts to perform full duplex communication, and cancels baseband self-interference in a baseband received signal by using the estimated response of the baseband self-interference channel, where the baseband received signal is a baseband signal received by the communications node during the full duplex communication.

Specifically, when the communications node performs the full duplex communication, the received baseband received signal includes a baseband signal sent by a peer communications node and self-interference. The communications node may perform analog on the self-interference by using the first estimation response. The communications node may cancel the baseband self-interference in the baseband received signal by using the analog baseband self-interference, so that the communications node can obtain the baseband signal sent by the peer communications node.

204. The communications node may determine a first parameter, where the first parameter is related to power of residual interference of baseband self-interference cancellation.

Optionally, in an embodiment, the baseband received signal may include a baseband received signal at a first time and a baseband received signal at a second time. The baseband received signal at the first time refers to a baseband signal received at the first time of the full duplex communication. The baseband received signal at the second time refers to a baseband signal received at the second time of the full duplex communication. The communications node determines a baseband signal transmitted at the first time and a processed signal at the first time, where the processed signal at the first time is the baseband received signal, at the first time, in which the self-interference is canceled; determines a baseband signal transmitted at the second time and a processed signal at the second time, where the processed signal at the second time is the baseband received signal, at the second time, in which the self-interference is canceled; and determines the first parameter according to the baseband signal transmitted at the first time, the processed signal at the first time, the baseband signal transmitted at the second time, and the processed signal at the second time, where the first parameter is in direct proportion to the power of the residual interference of the baseband self-interference cancellation. Optionally, the first time is a time for starting to perform the full duplex communication, and the second time is a time at which a decreased value of channel quality of the full duplex communication is less than a second preset threshold, where the channel quality may include any one or more of the following: an SINR, a CQI, or the like.

Specifically, the first parameter may be determined according to the following formula:

$$R_1 = \sum_{n=1}^{N} x_2(n)y_2'(n) - \sum_{n=1}^{N} x_1(n)y_1'(n) \quad \text{Formula 1.4}$$

where $R_1$ is the first parameter, $x_1(n)$ is the baseband signal transmitted at the first time, $y'_1(n)$ is the baseband received signal at the first time, $x_2(n)$ is the baseband signal transmitted at the second time, and $y'_2(n)$ is the baseband received signal at the second time.

$$\sum_{n=1}^{N} x_2(n)y_2'(n)$$

indicates a correlation coefficient of the second time, and $$\sum_{n=1}^{N} x_1(n)y_1'(n)$$

indicates a correlation coefficient of the first time.

Optionally, in another embodiment, in addition to determining the first parameter by using formula 1.4, the communications node may determine the first parameter in another manner, provided that it is ensured that the determined first parameter is in direct proportion to the power of the residual interference of the baseband self-interference cancellation. For example, when calculating the correlation coefficient of the first time and the correlation coefficient of the second time, the communications node may perform calculation on multiple data symbols, and then take an average value. A specific method is shown in the following formula:

$$\begin{cases} R_1 = \overline{x_2 y_2'} - \overline{x_1 y_1'} & \text{Formula 1.5} \\ \overline{x_2 y_2'} = \dfrac{x_2(n_1)y_2'(n_1) + x_2(n_2)y_2'(n_2) + \cdots + x_2(n_i)y_2'(n_i)}{i} \\ \overline{x_1 y_1'} = \dfrac{x_1(n_1)y_1'(n_1) + x_1(n_2)y_1'(n_2) + \cdots + x_1(n_i)y_1'(n_i)}{i} \end{cases}$$

where $R_1$ is the first parameter, $x_1(n_i)$ is a value, of the baseband signal transmitted at the first time, on the $n_i^{th}$ data symbol, $y'_1(n_i)$ is a value, of the baseband received signal at the first time, on the $n_i^{th}$ data symbol, $x_2(n_i)$ is a value, of the baseband signal transmitted at the second time, on the $n_i^{th}$ data symbol, $y'_2(n_i)$ is a value, of the baseband received signal at the second time, on the $n_i^{th}$ data symbol, and i is a positive integer.

Optionally, in another embodiment, the communications node may further directly measure the power of the residual interference of the baseband self-interference channel, and use the power of the residual interference as the first parameter.

205. If the first parameter is greater than a first preset threshold, determine that an estimation policy of the baseband self-interference channel is stopping performing the full duplex communication and re-starting to estimate the response of the baseband self-interference channel.

206. According to the estimation policy, stop performing the full duplex communication and re-start to estimate the response of the baseband self-interference channel.

Specifically, the first preset threshold is determined according to an emulation experiment. If the first parameter is greater than the first preset threshold, the residual interference may cause relatively great interference to a received desired signal. Therefore, the communications node needs to re-estimate the response of the baseband self-interference channel to reduce self-interference in the received signal by using the re-estimated response of the baseband self-interference channel.

According to the method shown in FIG. 2, when performing full duplex communication, a communications node may determine a first parameter at a proper moment, and determine, according to the determined first parameter, whether a response of a baseband self-interference channel needs to be re-estimated, so as to ensure precision of the estimated response of the baseband self-interference channel. That is, according to the method shown in FIG. 2, the communications node may select a proper time domain resource to send a baseband estimation signal, so as to estimate the response of the baseband self-interference channel. In addition, because timing of determining the response of the self-interference channel is determined according to the first parameter, a full duplex system that uses the method shown in FIG. 2 features high flexibility. Moreover, a change of an environment in which the full duplex system is located may affect residual interference of baseband self-interference cancellation. The first parameter is related to the residual interference of the baseband self-interference cancellation. Therefore, a manner of determining, by monitoring the first parameter, the timing of estimating the response of the baseband self-interference channel can effectively adapt to the change of the environment in which the system is located. An environment in which a wireless full duplex system that includes a home eNodeB and a terminal served by the home eNodeB is located may frequently change. For example, both an ambient scattering environment and a multipath characteristic of the system are changeable. Therefore, the method shown in FIG. 2 may be applied to the wireless full duplex system that includes the home eNodeB and the corresponding terminal.

Figure 3:
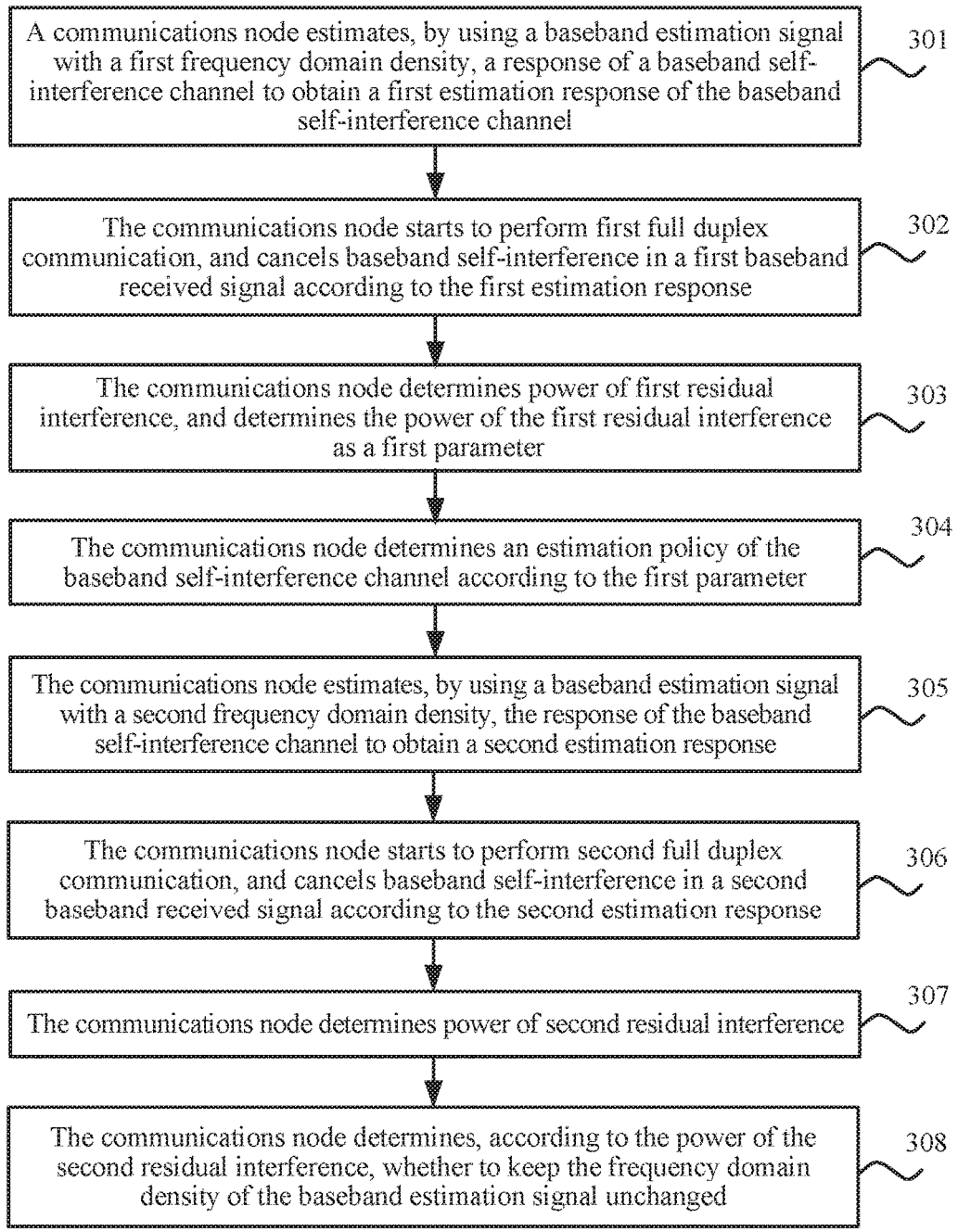
FIG. 3 is a schematic flowchart of a method for estimating a response of a baseband self-interference channel according to an embodiment of the present disclosure.

FIG. 3 is a schematic flowchart of a method for estimating a response of a baseband self-interference channel according to an embodiment of the present disclosure. The embodiment shown in FIG. 3 is a specific embodiment of the embodiment shown in FIG. 1. In the embodiment shown in FIG. 3, an LTE system is used as an example. A person skilled in the art may understand that the method provided by the embodiments of present disclosure may be further applied to another full duplex communications system.

301. A communications node estimates, by using a baseband estimation signal with a first frequency domain density, a response of a baseband self-interference channel to obtain a first estimation response of the baseband self-interference channel. The first frequency domain density means that neighboring self-interference pilot signals are separated by N1 subcarriers, where N1 is a positive integer.

Specifically, the communications node transmits a baseband estimation signal x on one resource block on an OFDM symbol. After the baseband estimation signal x passes through a transmit radio frequency channel, a transceiver spatial channel, and a receive radio frequency channel, and is processed by means of analog interference cancellation, the communications node may receive a baseband signal y corresponding to the baseband estimation signal x. Without considering nonlinearity of an aggregate channel between a receiving module and a sending module that are of a baseband of the communications node, a frequency domain of the baseband signal y received by the communications node is indicated as $y=hx+n$ where h is a to-be-estimated response of the baseband self-interference channel, and n is a noise. The response of the baseband self-interference channel may be estimated by using a method such as a minimum mean square error (MMSE), or least square (LS). A specific process of estimating the response of the baseband self-interference channel is common content of a person skilled in the art, and it is unnecessary to describe details herein.

302. The communications node starts to perform first full duplex communication, and cancels baseband self-interference in a first baseband received signal according to the first estimation response, where the first baseband received signal is a baseband signal received by the communications node during the first full duplex communication.

Specifically, when the communications node performs the full duplex communication, the received baseband received signal includes a baseband signal sent by a peer communications node and self-interference. The communications node may perform analog on the self-interference by using the first estimation response. The communications node may cancel the baseband self-interference in the baseband received signal by using the analog baseband self-interference, so that the communications node can obtain the baseband signal sent by the peer communications node.

303. The communications node determines power of first residual interference, and determines the power of the first residual interference as a first parameter. The power of the first residual interference is power of residual interference of the baseband self-interference channel in the first full duplex communication. The power of the first residual interference may be obtained by means of measurement.

304. The communications node determines an estimation policy of the baseband self-interference channel according to the first parameter.

Specifically, if the first parameter is greater than a third preset threshold, the communications node determines that the estimation policy of the baseband self-interference channel is estimating the response of the baseband self-interference channel by using a baseband estimation signal with a second frequency domain density, where the second frequency domain density is greater than the first frequency domain density. The second frequency domain density means that neighboring pilot signals are separated by N2 subcarriers, where N2 is a positive integer less than N1. If the first parameter is less than a third preset threshold, the communications node determines that the estimation policy of the baseband self-interference channel is estimating the response of the baseband self-interference channel by using the baseband estimation signal with the first frequency domain density.

The communications node may preset multiple alternative frequency domain densities. If the first parameter is greater than the third preset threshold, the communications node may select, as the second frequency domain density, from the multiple preset alternative frequency domain densities, one frequency domain density that is greater than the first frequency domain density and less than the other frequency domain densities.

The communications node may directly determine the second frequency domain density. For example, if the first parameter is greater than the third preset threshold, the communications node may directly reduce subcarriers between baseband estimation signals.

Further, in a case of determining that the estimation policy of the baseband self-interference channel is estimating the response of the baseband self-interference channel by using the baseband estimation signal with the second frequency domain density, the communications node may estimate the response of the baseband self-interference channel according to the estimation policy. Specifically, the communications node may execute step 305 to step 308 to estimate the response of the baseband self-interference channel and continue to adjust a frequency domain density of the baseband estimation signal.

305. The communications node estimates, by using a baseband estimation signal with a second frequency domain density, the response of the baseband self-interference channel to obtain a second estimation response.

A specific process of step 305 is similar to that of step 301, and it is unnecessary to describe details herein.

306. The communications node starts to perform second full duplex communication, and cancels baseband self-interference in a second baseband received signal according to the second estimation response, where the second baseband received signal is a baseband signal received by the communications node during the second full duplex communication.

A specific process of step 306 is similar to that of step 302, and it is unnecessary to describe details herein.

307. The communications node determines power of second residual interference. The power of the second residual interference is power of residual interference of the baseband self-interference channel in the second full duplex communication. The power of the second residual interference may be obtained by means of measurement.

An interval T between a time for determining the power of the second residual interference and a time for determining the power of the first residual interference may be fixed, or may be dynamically determined according to the response of the baseband self-interference channel or a change speed of the power of the residual interference.

308. The communications node determines, according to the power of the second residual interference, whether to keep the frequency domain density of the baseband estimation signal unchanged.

Specifically, if the power of the second residual interference is less than the third preset threshold, the communications node may determine to keep the frequency domain density of the baseband estimation signal unchanged, that is, continue to estimate the response of the baseband self-interference channel by using a pilot signal with the second frequency domain density. If the power of the second residual interference is greater than the third preset threshold, the communications node may determine a second parameter according to the power of the second residual interference and the power of the first residual interference, and determine, according to the second self-interference channel parameter, whether to increase the frequency domain density of the baseband estimation signal. Specifically, the communications node may determine the second parameter by using the following formula:

$$R_2 = P_1 - P_2 \quad \text{Formula 1.6}$$

where $R_2$ is the second parameter. $P_1$ is the power of the first residual interference, and $P_2$ is the power of the second residual interference. The determining, according to the second parameter, whether to increase the frequency domain density of the baseband estimation signal includes: if the second parameter is greater than a fourth preset threshold, determining to increase the frequency domain density of the baseband estimation signal; or if the second parameter is less than the fourth preset threshold, determining to estimate the response of the baseband self-interference channel by using the baseband estimation signal with the first frequency domain density. When increasing the frequency domain density of the baseband estimation signal, the communications node may directly select one frequency domain density from alternative frequency domain densities, where the selected frequency domain density is greater than the second frequency domain density and less than the other frequency domain densities. The communications node may directly increase the frequency domain density of the baseband estimation signal. That is, the communications node may directly reduce subcarriers between baseband estimation signals.

Further, in a case of executing step 308 and determining to increase the frequency domain density of the baseband estimation signal, the communications node may further increase the frequency domain density of the baseband estimation signal. In this case, the frequency domain density that is of the baseband estimation signal and determined in step 308 is equivalent to the second frequency domain density in step 304. A process of further increasing the frequency domain density of the baseband estimation signal is similar to step 305 to step 308.

It should be noted that the frequency domain density of the baseband estimation signal cannot be greater than a maximum frequency domain density. The maximum frequency domain density means that neighboring baseband estimation signals are separated by $N_{min}$ subcarriers, where $N_{min}$ meets the following conditions: If neighboring baseband estimation signals are separated by $N_{min}$ subcarriers, power of residual interference is greater than the third preset threshold; and if neighboring baseband estimation signals are separated by $(N_{min}-1)$ subcarriers, power of residual interference is less than the third preset threshold.

According to the method show in FIG. 3, when performing full duplex communication, a communications node may gradually increase a frequency domain density of a baseband estimation signal, so as to ensure precision of an estimated response of a baseband self-interference channel. That is, according to the method shown in FIG. 3, the communications node may select a proper frequency domain resource to send the baseband estimation signal, so as to estimate the response of the baseband self-interference channel. In addition, because whether to adjust the frequency domain density of the baseband estimation signal is determined according to power of residual interference, a full duplex system the uses the method shown in FIG. 3 features high flexibility. Moreover, a change of an environment in which the full duplex system is located may affect the residual interference of self-interference cancellation. A first parameter is the power of the residual interference, and a second parameter is related to the power of the residual interference. Therefore, a manner of determining, by monitoring the power of the residual interference, whether to adjust 15 the frequency domain density of the baseband estimation signal can effectively adapt to the change of the environment in which the system is located. An environment in which a wireless full duplex system that includes a home eNodeB and a terminal served by the home eNodeB is located may frequently change. For example, both an ambient scattering environment and a multipath characteristic of the system are changeable. Therefore, the method shown in FIG. 3 may be applied to the wireless full duplex system that includes the home eNodeB and the corresponding terminal.

Figure 4:
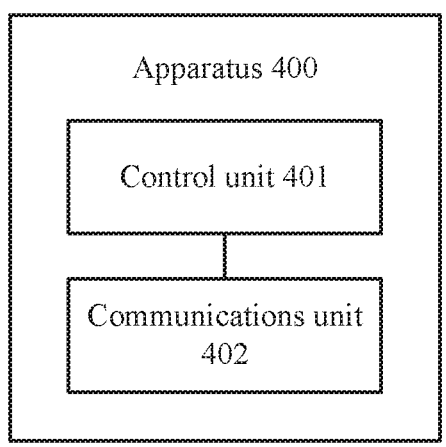
FIG. 4 is a structural block diagram of an apparatus according to an embodiment of the present disclosure.

FIG. 4 is a structural block diagram of an apparatus according to an embodiment of the present disclosure. An apparatus 400 shown in FIG. 4 may be on a communications node, where the communications node may be a fixed terminal or a mobile terminal, or the communications node may be a network node such as a base station or an AP. As shown in FIG. 4, the apparatus 400 includes a control unit 401 and a communications unit 402.

The control unit 401 is configured to estimate a response of a baseband self-interference channel to obtain a first estimation response of the baseband self-interference channel.

The communications unit 402 is configured to perform first full duplex communication.

The communications unit 402 is specifically configured to transmit a baseband signal and receive a baseband signal. Specifically, the communications unit 402 receives a radio frequency signal sent by another communications node, and converts the received radio frequency signal into a baseband signal.

The control unit 401 is further configured to cancel baseband self-interference in a first baseband received signal according to the first estimation response, where the first baseband received signal is a baseband signal received by the communications unit 402 during the first full duplex communication.

The control unit 401 is further configured to determine a first parameter of the baseband self-interference channel, where the first parameter is related to residual interference of the baseband self-interference channel.

The control unit 401 is further configured to determine an estimation policy of the baseband self-interference channel according to the first parameter.

The control unit 401 is further configured to estimate the response of the baseband self-interference channel according to the estimation policy.

An apparatus 400 shown in FIG. 4 can determine a corresponding estimation policy of a baseband self-interference channel according to a first parameter of the baseband self-interference channel, and estimate a response of the baseband self-interference channel according to the determined estimation policy of the baseband self-interference channel. In this way, the apparatus 400 can effectively increase precision of the estimated response of the baseband self-interference channel.

Optionally, in an embodiment, the control unit 401 may be configured to estimate, by using a baseband estimation signal, the response of the baseband self-interference channel to obtain the first estimation response of the baseband self-interference channel. Specifically, the communications unit 402 is configured to transmit a baseband estimation signal x and receive a baseband signal y corresponding to the baseband estimation signal x. The control unit 401 is specifically configured to estimate the response of the baseband self-interference channel according to the baseband estimation signal x and the baseband signal y. The control unit 401 may determine the first parameter according to the first baseband received signal in which the baseband self-interference is canceled. Specifically, the control unit 401 is specifically configured to: determine a baseband signal transmitted at a first time and a processed signal at the first time, where the processed signal at the first time is a first baseband received signal, at the first time, in which the baseband self-interference is canceled; determine a baseband signal transmitted at a second time and a processed signal at the second time, where the processed signal at the second time is a first baseband received signal, at the second time, in which the baseband self-interference is canceled; and determine the first parameter according to the baseband signal transmitted at the first time, the processed signal at the first time, the baseband signal transmitted at the second time, and the processed signal at the second time, where the first parameter is in direct proportion to power of the residual interference of the baseband self-interference channel.

Further, the control unit 401 is specifically configured to determine the first parameter according to the following formula:

$$R_1 = \sum_{n=1}^{N} x_2(n)y_2'(n) - \sum_{n=1}^{N} x_1(n)y_1'(n) \quad \text{Formula 1.7}$$

where $R_1$ is the first parameter, $x_1(n)$ is the baseband signal transmitted at the first time, $y'_1(n)$ is the baseband received signal at the first time, $x_2(n)$ is the baseband signal transmitted at the second time, and $y_2(n)$ is the baseband received signal at the second time.

$$\sum_{n=1}^{N} x_2(n)y_2'(n)$$

indicates a correlation coefficient of the second time, and $$\sum_{n=1}^{N} x_1(n)y_1'(n)$$

indicates a correlation coefficient of the first time.

In addition to determining the first parameter by using formula 1.7, the control unit 401 may determine the first parameter in another manner, provided that it is ensured that the determined first parameter is in direct proportion to the power of the residual interference of baseband self-interference cancellation. For example, when calculating the correlation coefficient of the first time and the correlation coefficient of the second time, the control unit 401 may perform calculation on multiple data symbols, and then take an average value. A specific method is shown in the following formula:

$$\begin{cases} R_1 = \overline{x_2 y_2'} - \overline{x_1 y_1'} & \text{Formula 1.8} \\ \overline{x_2 y_2'} = \dfrac{x_2(n_1)y_2'(n_1) + x_2(n_2)y_2'(n_2) + \cdots + x_2(n_i)y_2'(n_i)}{i} \\ \overline{x_1 y_1'} = \dfrac{x_1(n_1)y_1'(n_1) + x_1(n_2)y_1'(n_2) + \cdots + x_1(n_i)y_1'(n_i)}{i} \end{cases}$$

where $R_1$ is the first parameter, $x_1(n_i)$ is a value, of the baseband signal transmitted at the first time, on the $n_i^{th}$ data symbol, $y'_1(n_i)$ is a value, of the baseband received signal at the first time, on the $n_i^{th}$ data symbol, $x_2(n_i)$ is a value, of the baseband signal transmitted at the second time, on the $n_i^{th}$ data symbol, $y'_2(n_i)$ is a value, of the baseband received signal at the second time, on the $n_i^{th}$ data symbol, and i is a positive integer.

The control unit 401 may further directly measure the power of the residual interference of the baseband self-interference channel, and use the power of the residual interference as the first parameter.

Further, the first time may be a time for starting to perform the first full duplex communication, and the second time may be a time at which a decreased value of channel quality of the first full duplex communication is less than a second preset threshold, where the channel quality may include any one or more of the following: an SINR, a CQI, or the like.

Optionally, in another embodiment, the control unit 401 is specifically configured to estimate the response of the baseband self-interference channel by using a baseband estimation signal with a first frequency domain density. Specifically, the communications unit 402 is configured to transmit a baseband estimation signal x with the first frequency domain density and receive a baseband signal y corresponding to the baseband estimation signal x. The control unit 401 is specifically configured to estimate the response of the baseband self-interference channel according to the baseband estimation signal x with the first frequency domain density and the baseband signal y. The control unit 401 is specifically configured to: determine power of first residual interference, and determine the power of the first residual interference as the first parameter. The power of the first residual interference is power of the residual interference of the baseband self-interference channel in the first full duplex communication. The power of the first residual interference may be determined by the control unit 401 by means of measurement. The control unit 401 is specifically configured to: if the first parameter is greater than a third preset threshold, determine that the estimation policy of the baseband self-interference channel is estimating the response of the baseband self-interference channel by using a baseband estimation signal with a second frequency domain density, where the second frequency domain density is greater than the first frequency domain density; or if the first parameter is less than the third preset threshold, determine that the estimation policy of the baseband self-interference channel is estimating the response of the baseband self-interference channel by using the baseband estimation signal with the first frequency domain density.

Further, the control unit 401 is further configured to estimate, by using the baseband estimation signal with the second frequency domain density, the response of the baseband self-interference channel to obtain a second estimation response. Specifically, the communications unit 402 is configured to transmit a baseband estimation signal x2 with the second frequency domain density and receive a baseband signal y2 corresponding to the baseband estimation signal x2 with the second frequency domain density. The control unit 401 is specifically configured to estimate the response of the baseband self-interference channel according to the baseband estimation signal x2 and the baseband signal y2. The communications unit 402 is further configured to perform second full duplex communication. The control unit 401 is further configured to cancel baseband self-interference in a second baseband received signal according to the second estimation response, where the second baseband received signal is a baseband signal received during the second full duplex communication. The control unit 401 is further configured to determine power of second residual interference. The power of the second residual interference is power of residual interference of the baseband self-interference channel in the second full duplex communication. The power of the second residual interference may be determined by the control unit 401 by means of measurement. The control unit 401 is further configured to: if the power of the second residual interference is less than the third preset threshold, determine to keep the frequency domain density of the baseband estimation signal unchanged. The control unit 401 is further configured to: if the power of the second residual interference is greater than the third preset threshold, determine a second parameter according to the power of the second residual interference and the power of the first residual interference, and determine, according to the second parameter, whether to increase the frequency domain density of the baseband estimation signal.

The control unit 401 may determine the second parameter by using the following formula:

$$R_2 = P_1 - P_2 \qquad \text{Formula 1.9}$$

where $R_2$ is the second parameter, $P_1$ is the power of the first residual interference, and $P_2$ is the power of the second residual interference.

The control unit 401 is specifically configured to: if the second parameter is greater than a fourth preset threshold, determine to increase the frequency domain density of the baseband estimation signal; or if the second parameter is less than the fourth preset threshold, determine to estimate the response of the baseband self-interference channel by using the baseband estimation signal with the first frequency domain density. When increasing the frequency domain density of the baseband estimation signal, the control unit 401 may directly select one frequency domain density from alternative frequency domain densities, where the selected frequency domain density is greater than the second frequency domain density and less than the other frequency domain densities. The control unit 401 may directly increase the frequency domain density of the baseband estimation signal. That is, the control unit 401 may directly reduce subcarriers between baseband estimation signals.

Figure 5:
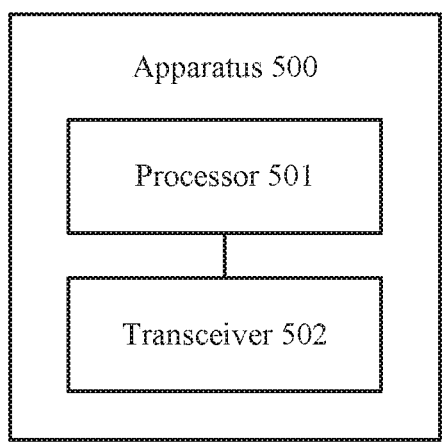
FIG. 5 is a structural block diagram of an apparatus according to an embodiment of the present disclosure.

FIG. 5 is a structural block diagram of an apparatus according to an embodiment of the present disclosure. An apparatus 500 shown in FIG. 5 may be on a communications node, where the communications node may be a fixed terminal or a mobile terminal, or the communications node may be a network node such as a base station or an AP. As shown in FIG. 5, the apparatus 500 includes a processor 501 and a transceiver 502.

The processor 501 is configured to estimate a response of a baseband self-interference channel to obtain a first estimation response of the baseband self-interference channel.

The transceiver 502 is configured to perform first full duplex communication.

The transceiver 502 may be configured to transmit a baseband signal and receive a baseband signal. Specifically, the transceiver 502 receives a radio frequency signal sent by another communications node, and converts the received radio frequency signal into a baseband signal.

The processor 501 is further configured to cancel baseband self-interference in a first baseband received signal according to the first estimation response, where the first baseband received signal is a baseband signal received by the transceiver 502 during the first full duplex communication.

The processor 501 is further configured to determine a first parameter of the baseband self-interference channel, where the first parameter is related to residual interference of the baseband self-interference channel.

The processor 501 is further configured to determine an estimation policy of the baseband self-interference channel according to the first parameter.

The processor 501 is further configured to estimate the response of the baseband self-interference channel according to the estimation policy.

An apparatus 500 shown in FIG. 5 can determine a corresponding estimation policy of a baseband self-interference channel according to a first parameter of the baseband self-interference channel, and estimate a response of the baseband self-interference channel according to the determined estimation policy of the baseband self-interference channel. In this way, the apparatus 500 can effectively increase precision of the estimated response of the baseband self-interference channel.

Optionally, in an embodiment, the processor 501 may be configured to estimate, by using the baseband estimation signal, the response of the baseband self-interference channel to obtain the first estimation response of the baseband self-interference channel. Specifically, the transceiver 502 is configured to transmit a baseband estimation signal x and receive a baseband signal y corresponding to the baseband estimation signal x. The processor 501 is specifically configured to estimate the response of the baseband self-interference channel according to the baseband estimation signal x and the baseband signal y. The processor 501 may determine the first parameter according to the first baseband received signal in which the baseband self-interference is canceled. Specifically, the processor 501 is specifically configured to: determine a baseband signal transmitted at a first time and a processed signal at the first time, where the processed signal at the first time is a first baseband received signal, at the first time, in which the baseband self-interference is canceled, determine a baseband signal transmitted at a second time and a processed signal at the second time, where the processed signal at the second time is a first baseband received signal, at the second time, in which the baseband self-interference is canceled: and determine the first parameter according to the baseband signal transmitted at the first time, the processed signal at the first time, the baseband signal transmitted at the second time, and the processed signal at the second time, where the first parameter is in direct proportion to power of the residual interference of the baseband self-interference channel.

Further, the processor 501 is specifically configured to determine the first parameter according to the following formula:

$$R_1 = \sum_{n=1}^{N} x_2(n)y'_2(n) - \sum_{n=1}^{N} x_1(n)y'_1(n) \quad \text{Formula 1.10}$$

where $R_1$ is the first parameter, $x_1(n)$ is the baseband signal transmitted at the first time, $y'_1(n)$ is the baseband received signal at the first time, $x_2(n)$ is the baseband signal transmitted at the second time, and $y'_2(n)$ is the baseband received signal at the second time.

$$\sum_{n=1}^{N} x_2(n)y'_2(n)$$

indicates a correlation coefficient of the second time, and $$\sum_{n=1}^{N} x_1(n)y'_1(n)$$

indicates a correlation coefficient of the first time.

In addition to determining the first parameter by using formula 1.10, the processor 501 may determine the first parameter in another manner, provided that it is ensured that the determined first parameter is in direct proportion to the power of the residual interference of baseband self-interference cancellation. For example, when calculating the correlation coefficient of the first time and the correlation coefficient of the second time, the processor 501 may perform calculation on multiple data symbols, and then take an average value. A specific method is shown in the following formula:

$$\begin{cases} R_1 = \overline{x_2 y'_2} - \overline{x_1 y'_1} & \text{Formula 1.11} \\ \overline{x_2 y'_2} = \dfrac{x_2(n_1)y'_2(n_1) + x_2(n_2)y'_2(n_2) + \cdots + x_2(n_i)y'_2(n_i)}{i} \\ \overline{x_1 y'_1} = \dfrac{x_1(n_1)y'_1(n_1) + x_1(n_2)y'_1(n_2) + \cdots + x_1(n_i)y'_1(n_i)}{i} \end{cases}$$

where $R_1$ is the first parameter, $x_1(n_i)$ is a value, of the baseband signal transmitted at the first time, on the $n_i^{th}$ data symbol, $y'_1(n_i)$ is a value, of the baseband received signal at the first time, on the $n_i^{th}$ data symbol, $x_2(n_i)$ is a value, of the baseband signal transmitted at the second time, on the $n_i^{th}$ data symbol, $y'_2(n_i)$ is a value, of the baseband received signal at the second time, on the $n_i^{th}$ data symbol, and i is a positive integer.

The processor 501 may directly measure the power of the residual interference of the baseband self-interference channel, and use the power of the residual interference as the first parameter.

Further, the first time may be a time for starting to perform the first full duplex communication, and the second time may be a time at which a decreased value of channel quality of the first full duplex communication is less than a second preset threshold, where the channel quality may include any one or more of the following: an SINR, a CQI, or the like.

Optionally, in another embodiment, the processor 501 is specifically configured to estimate the response of the baseband self-interference channel by using a baseband estimation signal with a first frequency domain density. Specifically, the transceiver 502 is configured to transmit a baseband estimation signal x with the first frequency domain density and receive a baseband signal y corresponding to the baseband estimation signal x with the first frequency domain density. The processor 501 is specifically configured to estimate the response of the baseband self-interference channel according to the baseband estimation signal x and the baseband signal y. The processor 501 is specifically configured to estimate the response of the baseband self-interference channel according to the baseband estimation signal x and the baseband signal y. The processor 501 is specifically configured to: determine power of first residual interference, and determine the power of the first residual interference as the first parameter. The power of the first residual interference is power of the residual interference of the baseband self-interference channel in the first full duplex communication. The power of the first residual interference may be determined by the processor 501 by means of measurement. The processor 501 is specifically configured to: if the first parameter is greater than a third preset threshold, determine that the estimation policy of the baseband self-interference channel is estimating the response of the baseband self-interference channel by using a baseband estimation signal with a second frequency domain density, where the second frequency domain density is greater than the first frequency domain density; or if the first parameter is less than the third preset threshold, determine that the estimation policy of the baseband self-interference channel is estimating the response of the baseband self-interference channel by using the baseband estimation signal with the first frequency domain density.

Further, the processor 501 is further configured to estimate, by using the baseband estimation signal with the second frequency domain density, the response of the baseband self-interference channel to obtain a second estimation response. Specifically, the transceiver 502 is configured to transmit a baseband estimation signal x2 with the second frequency domain density and receive a baseband signal y2 corresponding to the baseband estimation signal x2 with the second frequency domain density. The processor 501 is specifically configured to estimate the response of the baseband self-interference channel according to the baseband estimation signal x2 and the baseband signal y2. The transceiver 502 is further configured to perform second full duplex communication. The processor 501 is further configured to cancel baseband self-interference in a second baseband received signal according to the second estimation response, where the second baseband received signal is a baseband signal received during the second full duplex communication. The processor 501 is further configured to determine power of second residual interference. The power of the second residual interference is power of residual interference of the baseband self-interference channel in the second full duplex communication. The power of the second residual interference may be determined by the processor 501 by means of measurement. The processor 501 is further configured to: if the power of the second residual interference is less than the third preset threshold, determine to keep the frequency domain density of the baseband estimation signal unchanged. The processor 501 is further configured to: if the power of the second residual interference is greater than the third preset threshold, determine a second parameter according to the power of the second residual interference and the power of the first residual interference, and determine, according to the second parameter, whether to increase the frequency domain density of the baseband estimation signal.

The processor 501 may determine the second parameter by using the following formula:

$$R_2 = P_1 - P_2 \quad \text{Formula 1.12}$$

where $R_2$ is the second parameter, $P_1$ is the power of the first residual interference, and $P_2$ is the power of the second residual interference.

The processor 501 is specifically configured to: if the second parameter is greater than a fourth preset threshold, determine to increase the frequency domain density of the baseband estimation signal; or if the second parameter is less than the fourth preset threshold, determine to estimate the response of the baseband self-interference channel by using the baseband estimation signal with the first frequency domain density. When increasing the frequency domain density of the baseband estimation signal, the processor 501 may directly select one frequency domain density from alternative frequency domain densities, where the selected frequency domain density is greater than the second frequency domain density and less than the other frequency domain densities. The processor 501 may directly increase the frequency domain density of the baseband estimation signal. That is, the processor 501 may directly reduce subcarriers between baseband estimation signals.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the embodiments of present disclosure. Any variation or replacement readily figured out by a person skilled in the art within the technical scope disclosed in the embodiments of present disclosure shall fall within the protection scope of the embodiments of present disclosure. Therefore, the protection scope of the embodiments of present disclosure shall be subject to the protection scope of the claims.

What is claimed is:

1. A method for estimating a response of a baseband self-interference channel, wherein the method comprises:

estimating a response of a baseband self-interference channel to obtain a first estimation response of the baseband self-interference channel;

starting to perform first full duplex communication;

canceling baseband self-interference in a first baseband received signal according to the first estimation response, wherein the first baseband received signal is a baseband signal received during the first full duplex communication;

determining a first parameter of the baseband self-interference channel, wherein the first parameter is related to residual interference of the baseband self-interference channel;

determining an estimation policy of the baseband self-interference channel according to the first parameter; and estimating the response of the baseband self-interference channel according to the estimation policy.

2. The method according to claim 1, wherein the first baseband received signal comprises a first baseband received signal at a first time point and a first baseband received signal at a second time point; and the determining the first parameter of the baseband self-interference channel comprises:

determining a baseband signal transmitted at the first time point and a processed signal at the first time point, wherein the processed signal at the first time point is the first baseband received signal, at the first time point, in which the baseband self-interference is canceled;

determining a baseband signal transmitted at the second time point and a processed signal at the second time point, wherein the processed signal at the second time point is the first baseband received signal, at the second time point, in which the baseband self-interference is canceled; and determining the first parameter according to the baseband signal transmitted at the first time point, the processed signal at the first time point, the baseband signal transmitted at the second time point, and the processed signal at the second time point, wherein the first parameter is in direct proportion to power of the residual interference of the baseband self-interference channel.

3. The method according to claim 2, wherein the determining the first parameter according to the baseband signal transmitted at the first time point, the processed signal at the first time point, the baseband signal transmitted at the second time point, and the processed signal at the second time point comprises: determining the first parameter according to the following formula:

$$R_1 = \sum_{n=1}^{N} x_2(n)y'_2(n) - \sum_{n=1}^{N} x_1(n)y'_1(n),$$

wherein $R_1$ is the first parameter, $x_1(n)$ is the baseband signal transmitted at the first time point, $y'_1(n)$ is the processed signal at the first time point, $x_2(n)$ is the baseband signal transmitted at the second time point, and $y'_2(n)$ is the processed signal at the second time point.

4. The method according to claim 2, wherein the first time point is a time point for starting to perform the first full duplex communication, and the second time point is a time point at which a decreased value of channel quality of the first full duplex communication is less than a second preset threshold.

5. The method according to claim 1, wherein the determining the estimation policy of the baseband self-interference channel according to the first parameter comprises:

when the first parameter is greater than a first preset threshold, determining to stop performing the first full duplex communication and re-start to estimate the response of the baseband self-interference channel.

6. The method according to claim 1, wherein the estimating the response of the baseband self-interference channel to obtain the first estimation response of the baseband self-interference channel comprises:

estimating the response of the baseband self-interference channel by using a baseband estimation signal with a first frequency domain density; and the determining the estimation policy of the baseband self-interference channel according to the first parameter comprises:

when the first parameter is greater than a third preset threshold, determining that the estimation policy of the baseband self-interference channel is estimating the response of the baseband self-interference channel by using a baseband estimation signal with a second frequency domain density, wherein the second frequency domain density is greater than the first frequency domain density; and when the first parameter is less than a third preset threshold, determining that the estimation policy of the baseband self-interference channel is estimating the response of the baseband self-interference channel by using the baseband estimation signal with the first frequency domain density.

7. The method according to claim 6, wherein when the first parameter is greater than the third preset threshold, determining that the estimation policy of the baseband self-interference channel is estimating the response of the baseband self-interference channel by using the baseband estimation signal with the second frequency domain density, the estimating the response of the baseband self-interference channel according to the estimation policy comprises:

estimating, by using the baseband estimation signal with the second frequency domain density, the response of the baseband self-interference channel to obtain a second estimation response;

starting to perform second full duplex communication;

canceling baseband self-interference in a second baseband received signal according to the second estimation response, wherein the second baseband received signal is a baseband signal received during the second full duplex communication;

determining power of second residual interference; and when the power of the second residual interference is less than the third preset threshold, determining to keep the second frequency domain density of the baseband estimation signal unchanged; and when the power of the second residual interference is greater than the third preset threshold, determining a second parameter according to the power of the second residual interference and the power of the first residual interference, and determining, according to the second parameter, whether to increase the second frequency domain density of the baseband estimation signal.

8. The method according to claim 7, wherein the determining the second parameter according to the power of the second residual interference and the power of the first residual interference comprises: determining the second parameter by using the following formula:

$$R_2 = P_1 - P_2,$$

wherein $R_2$ is the second parameter, $P_1$ is the power of the first residual interference, and $P_2$ is the power of the second residual interference.

9. The method according to claim 7, wherein the determining, according to the second parameter, whether to increase the second frequency domain density of the baseband estimation signal comprises:

when the second parameter is greater than a fourth preset threshold, determining to increase the second frequency domain density of the baseband estimation signal; when the second parameter is less than a fourth preset threshold, determining to keep the second frequency domain density of the baseband estimation signal unchanged.

10. The method according to claim 1, wherein the determining the first parameter of the baseband self-interference channel comprises:

determining power of first residual interference; and
determining the first parameter as the power of the first residual interference.

11. An apparatus, wherein the apparatus comprises:
a processor, configured to estimate a response of a baseband self-interference channel to obtain a first estimation response of the baseband self-interference channel; and
a transceiver, configured to perform first full duplex communication,
wherein the processor is further configured to:
cancel baseband self-interference in a first baseband received signal according to the first estimation response, wherein the first baseband received signal is a baseband signal received by the transceiver during the first full duplex communication;
determine a first parameter of the baseband self-interference channel, wherein the first parameter is related to power of residual interference of the baseband self-interference channel;
determine an estimation policy of the baseband self-interference channel according to the first parameter; and
estimate the response of the baseband self-interference channel according to the estimation policy.

12. The apparatus according to claim 11, wherein:
the processor is configured to:
determine a baseband signal transmitted at a first time point and a processed signal at the first time point, wherein the processed signal at the first time point is a first baseband received signal, at the first time point, in which the baseband self-interference is canceled;
determine a baseband signal transmitted at a second time point and a processed signal at the second time point, wherein the processed signal at the second time point is a first baseband received signal, at the second time point, in which the baseband self-interference is canceled; and
determine the first parameter according to the baseband signal transmitted at the first time point, the processed signal at the first time point, the baseband signal transmitted at the second time point, and the processed signal at the second time point, wherein the first parameter is in direct proportion to the power of the residual interference of the baseband self-interference channel.

13. The apparatus according to claim 12, wherein the processor is configured to determine the first parameter according to the following formula:

$$R_1 = \sum_{n=1}^{N} x_2(n)y'_2(n) - \sum_{n=1}^{N} x_1(n)y'_1(n),$$

wherein $R_1$ is the first parameter, $x_1(n)$ is the baseband signal transmitted at the first time point, $y_1(n)$ is the processed signal at the first time point, $x_2(n)$ is the baseband signal transmitted at the second time point, and $y'_2(n)$ is the processed signal at the second time point.

14. The apparatus according to claim 11, wherein the processor is configured to: when the first parameter is greater than a first preset threshold, determine to stop performing the first full duplex communication and re-start to estimate the response of the baseband self-interference channel.

15. The apparatus according to claim 11, wherein:
the processor is configured to
estimate the response of the baseband self-interference channel by using a baseband estimation signal with a first frequency domain density; and
when the first parameter is greater than a third preset threshold, determine that the estimation policy of the baseband self-interference channel is estimating the response of the baseband self-interference channel by using a baseband estimation signal with a second frequency domain density, wherein the second frequency domain density is greater than the first frequency domain density; and when the first parameter is less than the third preset threshold, determine that the estimation policy of the baseband self-interference channel is estimating the response of the baseband self-interference channel by using the baseband estimation signal with the first frequency domain density.

16. The apparatus according to claim 15, wherein:
the processor is further configured to estimate, by using the baseband estimation signal with the second frequency domain density, the response of the baseband self-interference channel to obtain a second estimation response;
the transceiver is further configured to start second full duplex communication;
the processor is further configured to:
cancel baseband self-interference in a second baseband received signal according to the second estimation response, wherein the second baseband received signal is a baseband signal received during the second full duplex communication;
determine power of second residual interference; and
when the power of the second residual interference is less than the third preset threshold, determine to keep the second frequency domain density of the baseband estimation signal unchanged; and when the power of the second residual interference is greater than the third preset threshold, determine a second parameter according to the power of the second residual interference and the power of the first residual interference, and determine, according to the second parameter, whether to increase the second frequency domain density of the baseband estimation signal.

17. The apparatus according to claim 16, wherein the processor is configured to determine the second parameter by using the following formula:

$R_2 = P_1 - P_2$, wherein $R_2$ is the second parameter, $P_1$ is the power of the first residual interference, and $P_2$ is the power of the second residual interference.

18. The apparatus according to claim 17, wherein the processor is configured to: when the second parameter is greater than a fourth preset threshold, determine to increase the second frequency domain density of the baseband estimation signal; and when the second parameter is less than the fourth preset threshold, determine to estimate the response of the baseband self-interference channel by using the baseband estimation signal with the first frequency domain density.

19. The apparatus according to claim 11, wherein the processor is configured to: determine power of first residual interference, and determine the first parameter as the power of the first residual interference.

20. A method for estimating a response of a baseband self-interference channel, comprising:
    determining an initial estimation response of the baseband self-interference channel;
    receiving a baseband signal during a first full duplex communication;
    canceling baseband self-interference in the received baseband signal according to the initial estimation response;
    determining a parameter that is indicative of residual interference of the baseband self-interference channel;
    determining an estimation policy of the baseband self-interference channel according to the parameter; and
    determining the response of the baseband self-interference channel following the estimation policy.

* * * * *

UNITED STATES PATENT AND TRADEMARK OFFICE
CERTIFICATE OF CORRECTION

PATENT NO. : 10,044,531 B2
APPLICATION NO. : 15/332483
DATED : August 7, 2018
INVENTOR(S) : Hong Cheng et al.

It is certified that error appears in the above-identified patent and that said Letters Patent is hereby corrected as shown below:

In the Claims

In Column 27, Line 37, Claim 11, delete "channel:" and insert -- channel; --, therefor.

In Column 28, Line 8 (approx.), Claim 13, delete "y1(n)" and insert -- y'1(n) --, therefor.

Signed and Sealed this
Thirty-first Day of March, 2020

Andrei Iancu
*Director of the United States Patent and Trademark Office*